US012697820B2

(12) United States Patent
Jacobi et al.

(10) Patent No.: US 12,697,820 B2
(45) Date of Patent: Aug. 4, 2026

(54) SYSTEM, A VERTICAL AXIS MECHANISM AND A PRODUCTION METHOD

(71) Applicant: RIPPLES LTD., Petah Tikva (IL)

(72) Inventors: Ori Jacobi, Tel Aviv (IL); Avner Sadot, Tel Aviv (IL); Ophir Fuchs, Ness Ziona (IL); Eyal Eliav, Tel Aviv (IL); Mor Michael Brot, Petah Tikva (IL)

(73) Assignee: Ripples Ltd., Petah Tikva (IL)

( * ) Notice: Subject to any disclaimer, the term of this patent is extended or adjusted under 35 U.S.C. 154(b) by 139 days.

(21) Appl. No.: 18/044,987

(22) PCT Filed: Sep. 6, 2021

(86) PCT No.: PCT/IB2021/058094
§ 371 (c)(1),
(2) Date: Mar. 12, 2023

(87) PCT Pub. No.: WO2022/074480
PCT Pub. Date: Apr. 14, 2022

(65) Prior Publication Data
US 2023/0339235 A1 Oct. 26, 2023

(30) Foreign Application Priority Data

Oct. 8, 2020 (GB) ..................................... 2015960

(51) Int. Cl.
*B41J 3/407* (2006.01)
*A23P 20/18* (2016.01)
(Continued)

(52) U.S. Cl.
CPC ........... *B41J 3/40731* (2020.08); *A23P 20/18* (2016.08); *A23P 20/20* (2016.08); *B41J 3/407* (2013.01);
(Continued)

(58) Field of Classification Search
CPC ........ B41J 3/40731; B41J 3/407; B41J 11/20; A23P 20/20; A23P 2020/253;
(Continued)

(56) References Cited

U.S. PATENT DOCUMENTS 3,435,985 A 4/1969 Cornelius et al.
D215,350 S 9/1969 Fritts
(Continued)

FOREIGN PATENT DOCUMENTS

CN 203828770 U * 9/2014 ............ A47J 43/044
CN 205006650 U 2/2016
(Continued)

OTHER PUBLICATIONS

"Introducing the Ripple Maker II," YouTube, p. 1, Jul. 5, 2021, as downloaded from https://www.youtube.com/watch?v=N5OLUUlrCPQ.
(Continued)

*Primary Examiner* — Yaovi M Ameh
(74) *Attorney, Agent, or Firm* — Meitar Patents Ltd.; Daniel Kligler

(57) ABSTRACT

A system includes a tray (44), a printing assembly (22), an axis mechanism (10), a coupling mechanism (88) and a cover (54). Tray (44) configured for placing thereon a sample (70) including a first flowable-matter substrate (FMS) (69). Printing assembly (22) configured to print an image of edible substance on a second FMS layer (68) formed on first FMS (69). Axis mechanism (10) configured to control a distance (41) between sample (70) and printing assembly (22) by moving tray (44) with sample (70) along a vertical axis. Coupling mechanism (88) configured to couple between axis mechanism (10) and tray (44). Cover (54) configured to cover axis mechanism (10). Cover (54) has a front surface (77) that faces sample (70), and config-
(Continued)

ured to block a spillage of at least one of the first and second FMSs (69, 68) from wetting the axis mechanism (88).

17 Claims, 5 Drawing Sheets

(51) Int. Cl.

| | |
|---|---|
| *A23P 20/20* | (2016.01) |
| *B41J 11/20* | (2006.01) |
| *A23P 20/25* | (2016.01) |
| *A23P 30/00* | (2016.01) |
| *A47J 31/44* | (2006.01) |

(52) U.S. Cl.
CPC ......... *A23P 2020/253* (2016.08); *A23P 30/00* (2016.08); *A47J 31/44* (2013.01); *A47J 31/4403* (2013.01); *A47J 31/4407* (2013.01); *A47J 31/4425* (2013.01); *A47J 31/4482* (2013.01); *B41J 11/20* (2013.01)

(58) Field of Classification Search
CPC ....... A23P 20/18; A23P 30/00; A47J 31/4407; A47J 31/4482; A47J 31/44; A47J 31/4403; A47J 31/4425
See application file for complete search history.

(56) References Cited

U.S. PATENT DOCUMENTS

| | | | |
|---|---|---|---|
| 4,861,255 | A | 8/1989 | Ney |
| D701,248 | S | 3/2014 | Benedetto et al. |
| D734,788 | S | 7/2015 | Reches et al. |
| D749,155 | S | 2/2016 | Kemperle et al. |
| D752,661 | S | 3/2016 | Anantha et al. |
| D770,545 | S | 11/2016 | Olive et al. |
| D770,830 | S | 11/2016 | Eliav et al. |
| D787,574 | S | 5/2017 | Lee et al. |
| D871,463 | S | 12/2019 | Cao et al. |
| D893,564 | S | 8/2020 | Jeffery et al. |
| D900,172 | S | 10/2020 | Wu et al. |
| 10,813,488 | B2 | 10/2020 | Lavie et al. |
| D906,381 | S | 12/2020 | Jeffery et al. |
| D915,477 | S | 4/2021 | Sbabo |
| D916,147 | S | 4/2021 | Sbabo |
| D931,348 | S | 9/2021 | Zou |
| D934,926 | S | 11/2021 | Hong et al. |
| D934,927 | S | 11/2021 | Hong et al. |
| D958,236 | S | 7/2022 | Wu et al. |
| 11,517,141 | B1 | 12/2022 | Zeira et al. |
| D989,133 | S | 6/2023 | Bassir et al. |
| 2002/0023690 | A1 | 2/2002 | Sindermann |
| 2009/0317519 | A1* | 12/2009 | Lavie ........................ A23L 2/58 705/50 |
| 2013/0309369 | A1 | 11/2013 | Hershberg |
| 2016/0089898 | A1 | 3/2016 | Le et al. |
| 2017/0066252 | A1 | 3/2017 | Eliav et al. |

FOREIGN PATENT DOCUMENTS

| | | | |
|---|---|---|---|
| CN | 205381003 | U | 7/2016 |
| CN | 106079456 | A | 11/2016 |
| CN | 206791607 | U | 12/2017 |
| CN | 105818381 | B | 3/2018 |
| CN | 207653538 | U | 7/2018 |
| CN | 207821057 | U | 9/2018 |
| CN | 208096644 | U | 11/2018 |
| CN | 208658871 | U | 3/2019 |
| CN | 209003613 | U | 6/2019 |
| CN | 110027080 | A | 7/2019 |
| CN | 209269398 | U | 8/2019 |
| CN | 209421729 | U | 9/2019 |
| CN | 209660430 | U | 11/2019 |
| CN | 209694917 | U | 11/2019 |
| CN | 209712555 | U | 12/2019 |
| CN | 210810560 | U | 6/2020 |
| CN | 211807878 | U | 10/2020 |
| CN | 111976130 | A | 11/2020 |
| EP | 0995685 | B1 | 4/2003 |
| ES | 1215694 | U | 7/2018 |
| JP | 2013517820 | A | 5/2013 |
| KR | 101910596 | B1 | 10/2018 |
| KR | 102000909 | B1 | 7/2019 |
| KR | 102018027 | B1 | 9/2019 |
| KR | 102149142 | B1 | 9/2020 |
| WO | 91/14241 | A1 | 9/1991 |
| WO | 2005069729 | A2 | 8/2005 |
| WO | WO-2006050769 | A2 * | 5/2006 | ............ A47J 31/469 |
| WO | 2007013061 | A2 | 2/2007 |
| WO | 2008029186 | A1 | 3/2008 |
| WO | 2008047347 | A2 | 4/2008 |
| WO | 2015011691 | A1 | 1/2015 |
| WO | 2017221077 | A2 | 12/2017 |
| WO | 2019047382 | A1 | 3/2019 |
| WO | 2020084328 | A1 | 4/2020 |
| WO | 2022175790 | A1 | 8/2022 |

OTHER PUBLICATIONS

Wonder World, "Coffee Printer—Prints Images on Coffee Foam," YouTube, p. 1, Nov. 30, 2018, as downloaded from https://www.youtube.com/watch?v=iwIESqvRZmw.

"Wilbooxsweetin Latter Art Printer", Amazon.com, p. 1, Sep. 18, 2019.

CN Application # 202180065045.5 Office Action dated Mar. 20, 2024.

U.S. Appl. No. 29/770,943 Office Action dated May 2, 2024.

Eliav et al., U.S. Appl. No. 29/770,943, filed Feb. 18, 2021.

Physik Instrumente (PI), "High precision and motion control industrial automation XY & XYZ stages", pp. 1-66, Mar. 15, 2018.

PI-USA, "Adapter Brackets and Adapter Plate", Datasheet, pp. 1-6, Mar. 23, 2018.

Production Gear Ltd, "Kupo Stage Clamp W/16mm Stud", pp. 1-3, year 2021 downloaded from https://www.productiongear.co.uk/kupo-stage-clamp-w/16mm-stud.html.

International Application # PCT/IB2021/058094 Search Report dated Dec. 29, 2021.

GB Application # 2015960.4 Office Action dated Oct. 31, 2022.

GB Application # 2015960.4 Office Action dated Mar. 22, 2021.

CN Application # 202180065045.5 Office Action dated Jun. 27, 2024.

JP Application # 2023-517234 office action dated Apr. 8, 2025.

Japanese Patent Office (JPO) Office Action, patent application # 2023-549981 dated Oct. 21, 2025.

Korean Intellectual Property Office (KIPO) Office Action, patent application # 10-2023-7010779 dated Oct. 27, 2025.

* cited by examiner

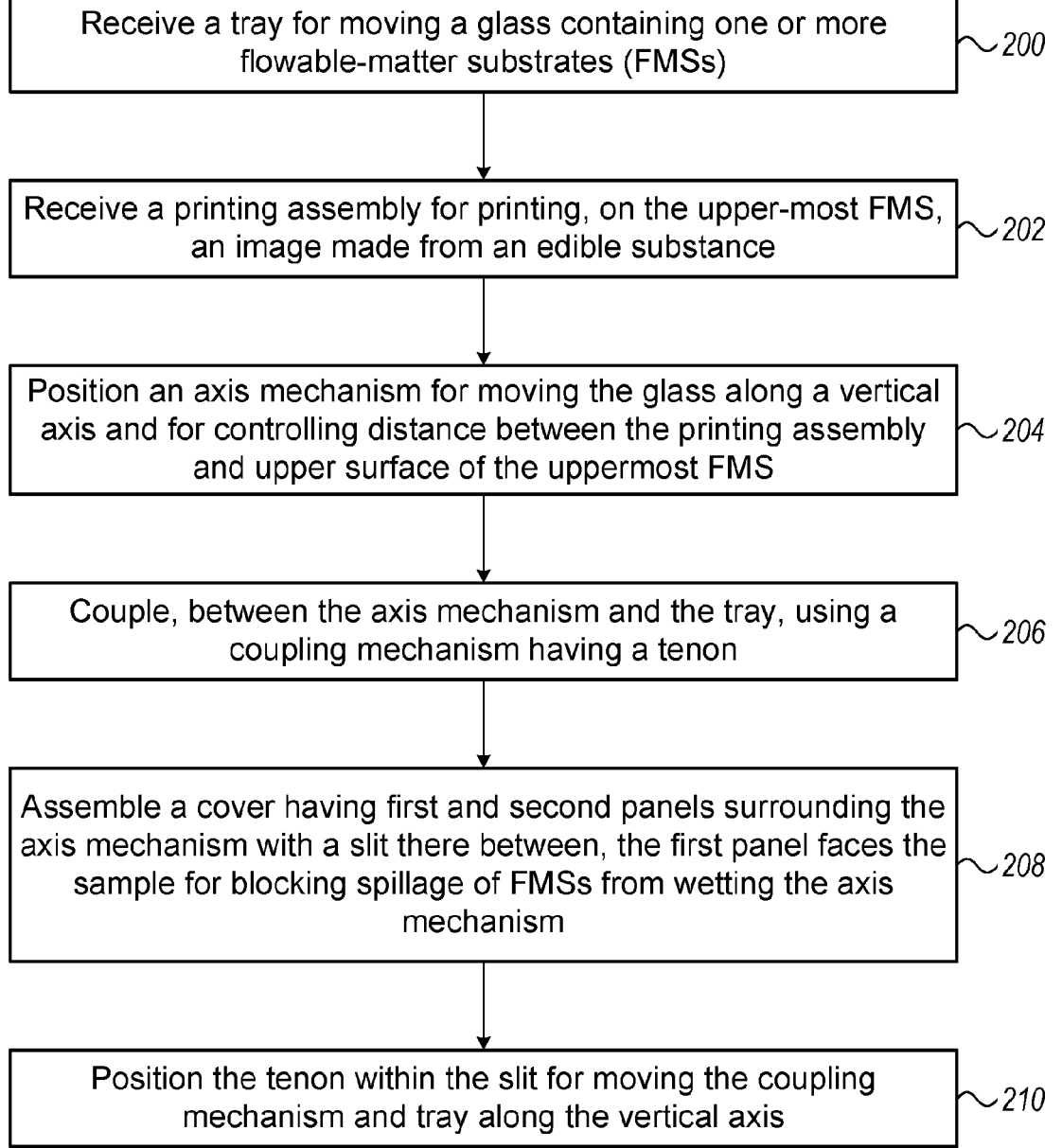

Receive a tray for moving a glass containing one or more flowable-matter substrates (FMSs) ~200

Receive a printing assembly for printing, on the upper-most FMS, an image made from an edible substance ~202

Position an axis mechanism for moving the glass along a vertical axis and for controlling distance between the printing assembly and upper surface of the uppermost FMS ~204

Couple, between the axis mechanism and the tray, using a coupling mechanism having a tenon ~206

Assemble a cover having first and second panels surrounding the axis mechanism with a slit there between, the first panel faces the sample for blocking spillage of FMSs from wetting the axis mechanism ~208

Position the tenon within the slit for moving the coupling mechanism and tray along the vertical axis ~210

*FIG. 3*

SYSTEM, A VERTICAL AXIS MECHANISM AND A PRODUCTION METHOD

FIELD OF THE INVENTION

The present invention relates to a system, a vertical axis mechanism and a production method. In embodiments, the present invention relates generally to systems for printing edible images on flowable-matter substrates, and particularly to methods and systems for printing edible images on flowable-matter substrates with vertical motion and spillage protection.

BACKGROUND OF THE INVENTION

Various techniques have been published in the patent literature for vertically-moving samples containing flowable edible substances in food processing and decorating systems.

For example, PCT International Publications WO 2015/011691 describes an extrusion device and a collapsible cartridge containing extrudable food material, preferably soft serve ice cream. The extrusion device comprises: a fixed piston, a movable chamber, having two ends, namely one end arranged to receive the fixed piston, and another end equipped with an outlet for the movable chamber. The movable chamber being disposed to house a collapsible cartridge containing an extrudable food material that is extruded through a nozzle aligned with the outlet of the movable chamber. A mechanism for moving the movable chamber, and a frame with which the fixed piston and the mechanism for moving the movable chamber are assembled. As the movable chamber moves toward the fixed piston, the fixed piston applies pressure on the collapsible cartridge in the movable chamber in order to extrude the extrudable food material through the nozzle of the collapsible cartridge.

U.S. Pat. No. 4,861,255 describes an apparatus for converting hard frozen confection to soft frozen confection, by single servings, flavoring and extruding it. A super fresh product with outstanding flavor and consistency is produced. Fruit additions remain soft and flavorful, not frozen; cookie additions remain crisp, not soggy as in ordinary ice cream. Hundreds of flavor combinations become practical to make. The invention utilizes a piston and cylinder to pressurize the product for extrusion, and a special rotating wheel, on a retractable shaft thru the piston, that performs the mixing, cutting, milling, and sweeping functions. Aggregates are swept into a central extrusion orifice by this wheel. The commercial version of the apparatus requires $1/10$ HP to operate, and weighs 62 pounds. The "household" version of this machine weighs 30 pounds.

PCT International Publications WO 91/14241 describes a cup dispenser operable to dispense cups from a vertical stack of nested cups, cup transferring means movable between a cup-receiving position beneath the dispenser and a drink-receiving position beneath spouts of the machine for dispensing a drink, and moving means for moving the cup transferring means between its positions in synchronization with the operation of the dispenser. A single motor constitutes the moving means and also operates the dispenser.

SUMMARY OF THE INVENTION

An embodiment of the present invention that is described herein provides a system including a tray, a printing assembly, an axis mechanism, a coupling mechanism and a cover. The tray is configured for placing thereon a sample including at least a first flowable-matter substrate. The printing assembly is configured to print an image, made from an edible substance, on a second flowable-matter substrate layer formed on the first flowable-matter substrate of the sample. The axis mechanism is configured to control a distance between the sample and the printing assembly by moving the tray with the sample along a vertical axis. The coupling mechanism is configured to couple between the axis mechanism and the tray. The cover is configured to cover the axis mechanism. The cover has a front surface that at least partially faces the sample, and is configured to block a spillage of at least one of the first and second flowable-matter substrates from wetting the axis mechanism.

In some embodiments, the cover has one or more additional surfaces, which do not face the sample, and at least one of the additional surfaces has a slit that extends along the vertical axis. The coupling mechanism includes a tenon, which is positioned within the slit and is configured to slide along the slit for moving the coupling mechanism along the vertical axis. In other embodiments, the cover includes (i) a first panel having the front surface, and (ii) a second panel positioned at a predefined distance from the first panel, so as to form the slit between the first and second panels. In yet other embodiments, the first panel includes at least part of the one or more additional surfaces, which are bent relative to the front surface.

In an embodiment, the first and second panels have a U-shape and are facing one another so as to form an inner volume containing at least the axis mechanism. In another embodiment, the system includes a motion assembly, which is configured to drive the axis mechanism for moving the coupling mechanism. In yet another embodiment, the system includes a processor, which is configured to control the motion assembly to move the tray between at least: (i) a loading and unloading position of the container, respectively, on and off the tray, and (ii) a printing position, which is adjacent to the printing assembly for printing the image on the second flowable-matter substrate.

In some embodiments, the axis mechanism includes a rotatable shaft, which is configured to be rotated by the motion assembly and to move the coupling mechanism. In other embodiments, the rotatable shaft includes a screw shaft. In yet other embodiments, the axis mechanism includes one or more shafts extended along the vertical axis, and the coupling mechanism is configured to slide along the one or more shafts for moving the tray along the vertical axis.

There is additionally provided, in accordance with an embodiment of the present invention, a vertical axis mechanism (VAM) including a coupling mechanism and a cover of the axis mechanism. The coupling mechanism is configured to couple between (i) an axis mechanism and (ii) a tray for placing thereon a sample including at least a first flowable-matter substrate, along the vertical axis so as to print on the sample an image made from an edible substance. The cover of the axis mechanism includes a front surface that at least partially faces the sample and is configured to block a spillage of the first flowable-matter substrate from wetting the axis mechanism.

In some embodiments, the sample includes a container, which is configured to contain at least a second flowable-matter substrate formed on the first flowable-matter substrate, and including a processor, which is configured to control the motion assembly to move the tray between at least: (i) a loading and unloading position of the container, respectively, on and off the tray, and (ii) a printing position, which is adjacent to a printing assembly for printing the image on the second flowable-matter substrate.

There is further provided, in accordance with an embodiment of the present invention, a production method including receiving a tray for placing thereon a sample including a flowable-matter substrate. A printing assembly for printing an image, made from an edible substance, on the flowable-matter substrate, is received. An axis mechanism for moving the tray with the sample along a vertical axis, is received. A coupling mechanism is coupled between the axis mechanism and the tray. The axis mechanism is covered using a cover having a front surface that at least partially faces the sample for blocking a spillage of the flowable-matter substrate from wetting the axis mechanism.

In some embodiments, the method includes coupling, to the axis mechanism, a motion assembly for driving the axis mechanism and moving the coupling mechanism. In other embodiments, the method includes connecting the motion assembly to a processor for controlling the motion assembly to move the tray between at least: (i) a loading and unloading position of the container, respectively, on and off the tray, and (ii) a printing position, which is adjacent to the printing assembly for printing the image on the flowable-matter substrate.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for producing a system configured for printing edible images on FMSs, in accordance with an embodiment of the present invention.

DETAILED DESCRIPTION OF EMBODIMENTS

Overview

Figure 1A:
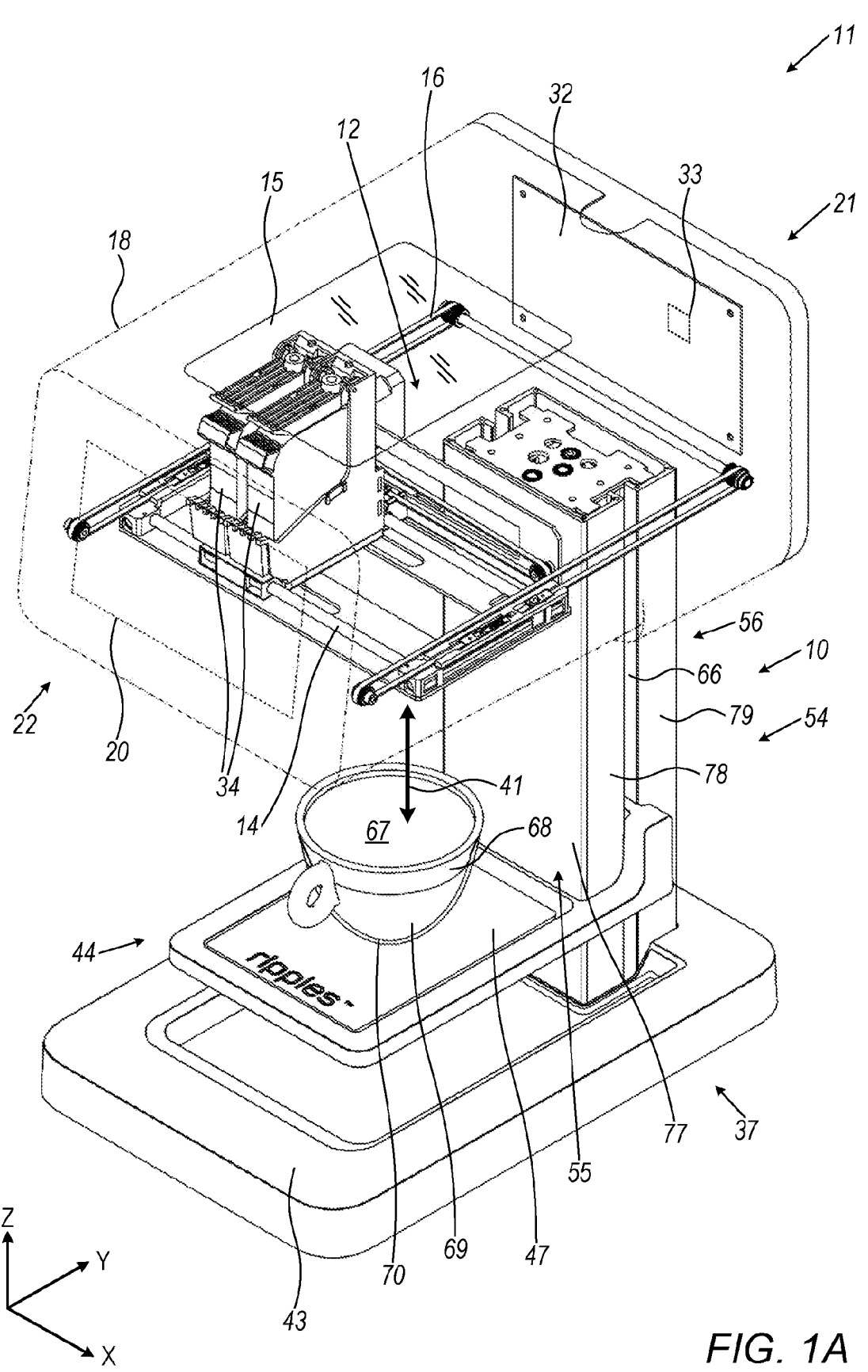
FIGS. 1A and 1B are schematic, pictorial illustrations of a system for printing edible images on flowable-matter substrates (FMSs), in accordance with embodiments of the present invention.

Embodiments of the present invention that are described hereinbelow provide improved techniques for moving flowable-matter substrates (FMSs) along a vertical axis of a system for printing images on the top surface of the upper-most FMS.

In some embodiments, a system for printing edible images on the top surface of the upper-most FMS comprises a printing assembly, a tray, a vertical-axis mechanism (VAM), a coupling mechanism and a cover.

In some embodiments, the tray is configured to carry a container, such as a glass or cup, having a first and second FMSs, such as a suitable foam produced over coffee or beer. The description below is related to beer and malt foam, but is equally applicable, mutatis mutandis, to any other suitable types of one or more FMSs.

In some embodiments, the printing assembly comprises one or more reservoirs of edible substance, e.g., malt, and one or more print heads configured to move relative to the foam and to print an image, made from the edible substance, on the upper surface of the foam. The VAM, which is described in detail hereinbelow, is configured to control the distance between the foam and the printing assembly by moving the tray carrying the beer glass along a vertical axis of the system.

In some embodiments, the coupling mechanism, is configured to couple between the axis mechanism and the tray, and has one or more tenons. The system further comprises a processor and a motion assembly, which is controlled by the processor and is configured to drive the axis mechanism for moving the coupling mechanism.

In some embodiments, the VAM comprises (i) one or more shafts extended along the vertical axis, wherein the coupling mechanism is configured to slide along the one or more shafts for moving the tray along the vertical axis, and (ii) a rotatable shaft, such as a screw shaft, which is configured to be rotated by the motion assembly and to move the coupling mechanism.

In some embodiments, the processor is configured to control the motion assembly and VAM for moving the tray along the vertical axis between (i) a loading/unloading position, in which the beer glass is placed on or removed from the tray, and (ii) a printing position, in which the print heads are moving relative to the beer glass for printing the edible image on the foam surface.

Note that when the beer glass moved along the vertical axis, one or more of the FMSs (e.g., the foam and beer) may be spilled out of the beer glass and may wet the VAM or other components or modules of the system that have to remain dried. Such wetting may interfere with the day-to-day operation of the system, require excess maintenance, and even cause the system to malfunction.

In some embodiments, the system comprises a cover, which is configured to cover at least the VAM. The cover may comprise one or more panels, e.g., two U-shaped panels, configured to surround at least the VAM, for encapsulation, and therefore, to protect the VAM against spillage of the aforementioned FMSs.

In some embodiments, a first panel of the cover may have a front surface that at least partially faces the beer glass, and is configured to block the spillage of at least one of the FMSs from wetting the VAM. The first cover may have additional surfaces, which are bent, e.g, orthogonal to the front surface, thus forming the U-shape.

In some embodiments, a second panel of the cover may have a U-shape with given surfaces, which are positioned at a predefined distance from the additional surfaces of the first panel, so as to define, between each pair of the additional and given surfaces, a slit, which is not facing the beer glass.

In some embodiments, the first and second panels are disposed around the VAM, such that each tenon of the coupling mechanism is positioned within a respective slit, and is configured to slide along the slit for moving the coupling mechanism and the tray along the vertical axis.

The disclosed techniques improve the throughput and reliability of systems for dispensing any suitable substance on the surface of any sort of fluids moved along an axis, and in particular for printing edible images on edible FMS.

SYSTEM DESCRIPTION

FIG. 1A is a schematic, pictorial illustration of a system 11 configured for printing edible images on one or more flowable-matter substrates (FMSs), in accordance with an embodiment of the present invention.

In some embodiments, system 11 comprises a printing assembly 22, a tray 44, and a vertical-axis mechanism (VAM) 10. In the present example, VAM 10 is positioned between printing assembly 22 and tray 44, and is configured to move tray 44, relative to printing assembly 22 along a Z-axis, which is the vertical axis of system 11. VAM 10 and tray 44 are described in detail in FIGS. 2A and 2B below. Tray 44 is configured to be moved, along the Z-axis, between a base 37 of system 11 and printing assembly 22.

In the context of the present disclosure, the terms "vertical axis" and "Z-axis" are used interchangeably and refer to an axis for moving tray 44 along the Z-axis of the XYZ coordinate system of FIG. 1A (and of FIGS. 1B, 2A and 2B below).

In some embodiments, tray 44 is configured to carry and move a sample, such as a container having one or more FMSs, along the vertical axis of system 11. In the present example, the container comprises a glass 70 or a cup, configured to contain the one or more FMSs described herein.

In the context of the present disclosure and in the claims, the term FMS refers to any matter that can flow, such as, but not limited to, edible-matter surfaces of liquid, e.g. beverages such as cocktail, milkshake, beer, coffee, tea, (e.g. chia, matcha, etc.), fruit shake, vegetable shake, soda, and yogurt. Additionally or alternatively, the FMS may comprise foam (e.g. foam of a beverage). Examples of foams may comprise beer foam, egg-whites foam, milk-foam, and milk-substitute foam, soybean foam, aquafaba foam, chickpea foam, nitro foam (meaning a beverage infused with nitrogen, causing a foam mixture of the beverage and nitrogen bubbles), *quillaia* extract, *yucca* extract, or any other suitable type of foam.

In the example of FIG. 1A, the FMSs comprise: (i) a drinkable liquid, such as a beer 69 poured into glass 70, and (ii) a malt-based foam 68 formed on top of beer 69 and having an upper surface, referred to herein as a surface 67. Alternatively, the FMSs may comprise: (i) liquid coffee instead of beer 69, and (ii) a frothed-milk instead of foam 68 placed on top of the coffee, or any other suitable types of FMSs, such as those described above.

In some embodiments, printing assembly 22 comprises a housing, also referred to herein as a cover 18, which is typically opaque and made of metal or polymer or a combination thereof, or any other suitable material. Alternatively, cover 18 may be translucent or completely transparent.

In some embodiments, printing assembly 22 comprises one or more print heads 34, configured to: (i) receive one or more types of edible ink (e.g., malt-based or coffee-based solutions), (ii) be moved along an X-axis 14 and/or a Y-axis 16 of an XY stage 12, and (iii) apply (e.g., by inkjet printing) the edible ink to surface 67 of foam 68, so as to produce an edible image thereon.

In some embodiments, printing assembly 22 may comprise a transparent window 15, which enables viewing the printing process.

In some embodiments, system 11 comprises one or more substrates, in the present example printed circuit boards (PCBs) 32, having multiple active and passive electronic devices, such as a processor 33, which may be hidden by a package or between the PCBs, and therefore, shown as a dashed frame on PCB 32. PCBs 32 may comprise other devices (not shown), such as but not limited to memory devices, input/output (IO) ports and communication devices, chipsets, controllers, and other active and/or passive devices (e.g., one or more resistors, capacitors, and inductors).

Typically, processor 33 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, system 11 comprises cables or any suitable wireless communication devices (not shown) configured to transmit signals exchanged between PCBs 32 and various components and modules of system 11, and between PCBs 32 and entities external to system 11. For example, processor 33 is configured to receive, from an external source, via the aforementioned cables or wirelessly, an image intended for being printed on surface 67. Subsequently, processor 33 is configured to transmit, e.g., to controllers of XY stage 12 and one or more print heads 34, a printing signal indicative of instructions for printing the edible image on surface 67 of foam 68.

In some embodiments, system 11 comprises front and back panels coupled, respectively, to the front and back sides of cover 18, and described herein. In the context of the present disclosure, the term "front side" refers to a side of system 11 facing an operator of system 11, e.g., a bartender, and the term "back side" refers to a side of system 11 facing, for example, a client that may receive glass 70 after printing the edible image on surface 67.

In some embodiments, a back panel 21 of system 11, which is facing the client, may comprise a fixed or interchangeable signage, configured to display any suitable content, such as but not limited to, a commercial advertisement. In alternative embodiments, back panel 21 may comprise a display, configured to display any suitable content, such as but not limited to, a gallery of digital images to be selected by the client, an image selected by the client or received from a mobile device of the client, a commercial video, an internet browser, broadcasted content (e.g., received from a selected television channel), a film selected by the client, or any other suitable content.

In some embodiments, the front panel may comprise any suitable type of a display 20, e.g., a touch screen of a flat panel, which is configured to serve as a graphical user interface (GUI) for controlling system 11. The GUI displayed on display 20 may be used by the bartender or by any other user of system 11, such as but not limited to, a service technician of system 11. Additionally or alternatively, system 11 may comprise a remote controlling device (not shown), such as a smartphone or a tablet, having a software interface with the GUI displayed by processor 33. In such cases, at least one of display 20 and back panel 21 may have additional or alternative uses.

This method of printing edible images on FMSs is implemented, for example, in the RIPPLE MAKER™ and systems, produced by Ripples™ LTD. (Petah Tikva, Israel) and is described in detail, for example, in U.S. Patent Application Publication 2009/0317519, which is incorporated herein by reference. Moreover, U.S. Patent Application Publication 2009/0317519 further describes examples of use cases of a GUI for controlling system 11, designs of digital images to be applied by system 11 to surface 67, and methods for receiving, displaying and applying digital images to surface 67.

In some embodiments, processor 33 is configured to control a motion assembly (shown in FIGS. 2A and 2B below) and VAM 10 to move tray 44 along the vertical axis of system 11. In the present example, tray 44 is moved between (i) a loading/unloading position, in which glass 70 is placed on or removed from tray 44, and (ii) a printing position, in which print heads 34 are moving relative to glass 70 for printing the edible image on surface 67 of foam 68.

In the example of FIG. 1A, tray 44 is positioned at the printing position, however, tray 44 is lifted along Z-axis toward printing assembly 22, so as to position surface 67 of foam 68, at a specified distance 41 from printing assembly 22 (e.g., less than about 1 cm), so as to obtain the preferred conditions for printing the ink image of surface 67.

In some embodiments, system 11 may comprise one or more sensors (not shown), which are configured to produce signals used by processor 33 for controlling the position of tray 44. For example, a sensor may produce a signal indicative of a distance between two parts of system 11. In such embodiments, processor 33 is configured, based on the signal received from the sensor, to control the position of tray 44 along the vertical axis.

In the context of the present disclosure, the terms "about" or "approximately" for any numerical values or ranges indicate a suitable dimensional tolerance that allows the part or collection of components to function for its intended purpose as described herein.

In the example of system 11, glass 70 is carried by tray 44 and is moved by the moving assembly, as will be described in detail in FIGS. 2A and 2B below. In some cases, when glass 70 is moved along the vertical axis, one or both of foam 68 and beer 69 may be spilled out of glass 70 and may wet VAM 10. Such wetting may interfere with the day-to-day operation of system 11, may require excess maintenance (at least to VAM 10), and in severe cases, may cause malfunctions in system 11.

In some embodiments, system 11 comprises a cover 54, which is configured to cover at least VAM 10 from being wetted by the aforementioned FMSs that may have been spilled.

In some embodiments, cover 54 may comprise one or more panels, in the present example, panels 55 and 56 having a U-shape as shown through printing assembly 22 and will be shown and described in more detail in FIGS. 2A and 2B below. In some embodiments, panels 55 and 56 are configured to surround at least VAM 10, for encapsulating, and therefore, protecting VAM from being wetted by spillage of the aforementioned FMSs.

In some embodiments, panel 55 of cover 54 has a front surface, referred to herein as a surface 77, which is facing glass 70 and is configured to block the spillage of at least one of beer 69 and foam 68 from wetting VAM 10. In the present example, panel 55 has a single surface 77, but in other embodiments, panel 55 may have any other configuration suitable for blocking the spillage of at least one of foam 68 and beer 69 from wetting VAM 10. For example, instead of having a single surface 77, panel 55 may have two or more surfaces arranged along a slope and configured to convey the one or more spilled FMSs to a drain of system 11.

In some embodiments, panel 55 may have additional surfaces, such as a surface 78, which is being bent, e.g., orthogonally to surface 77. In such embodiments, adding to surfaces 77 and 78, an additional surface (not shown), which is bent orthogonally to surface 77 and positioned at the hidden side of panel 55 forming the U-shape of panel 55, as shown through printing assembly 22 and also shown and described in FIGS. 1B, 2A and 2B below.

In some embodiments, panel 56 of cover 54 may also have a U-shape with a surface 79, which is positioned at a predefined distance from surface 78 of panel 55, so as to define, between each pair of surfaces 78 and 79, a slit 66, which is not facing glass 70 having the aforementioned FMSs (e.g., foam 68 and beer 69). In such embodiments, even if being spilled, foam 68 and/or beer 69 cannot wet VAM 10.

In some embodiments, surfaces 78 and 79, which are aligned with one another, e.g., in a YZ-plane of the XYZ coordinate system of FIG. 1A (and of FIGS. 1B, 2A and 2B below), may be considered as a single surface at the YZ-plane, having slit 66, which extends along the Z-axis of system 11.

Note that cover 54, VAM 10 and additional parts and assemblies of system 11, which are related to the present disclosure, are described in detail in FIGS. 2A and 2B below.

In other embodiments, in addition to or instead of one or more print heads 34, system 11 may comprise any other suitable apparatus for applying the edible image to surface 67 of foam 68. Such techniques for applying designs of the ink image to surface 67 are described, for example, in PCT International Publications WO 2007/013061 and WO 2005/069729, whose disclosures are all incorporated herein by reference.

In other embodiments, VAM 10 may be positioned at any other suitable location of system 11, and may have any other suitable configuration for moving printing assembly 22 and tray 44 relative to one another.

This particular configuration of system 11 is shown by way of example, in order to illustrate certain problems that are addressed by embodiments of the present invention and to demonstrate the application of these embodiments in enhancing the performance of such a system. Embodiments of the present invention, however, are by no means limited to this specific sort of example system, and the principles described herein may similarly be applied to other sorts of systems for printing edible substance on any suitable type of one or more FMSs.

Moreover, the description of system 11 is simplified for the sake of conceptual clarity, and the configuration of system 11 may comprise additional components, which are typically not essential for the description of the disclosed invention, and therefore, are intentionally omitted from the description of modules, assemblies and parts of system 11.

Figure 1B:
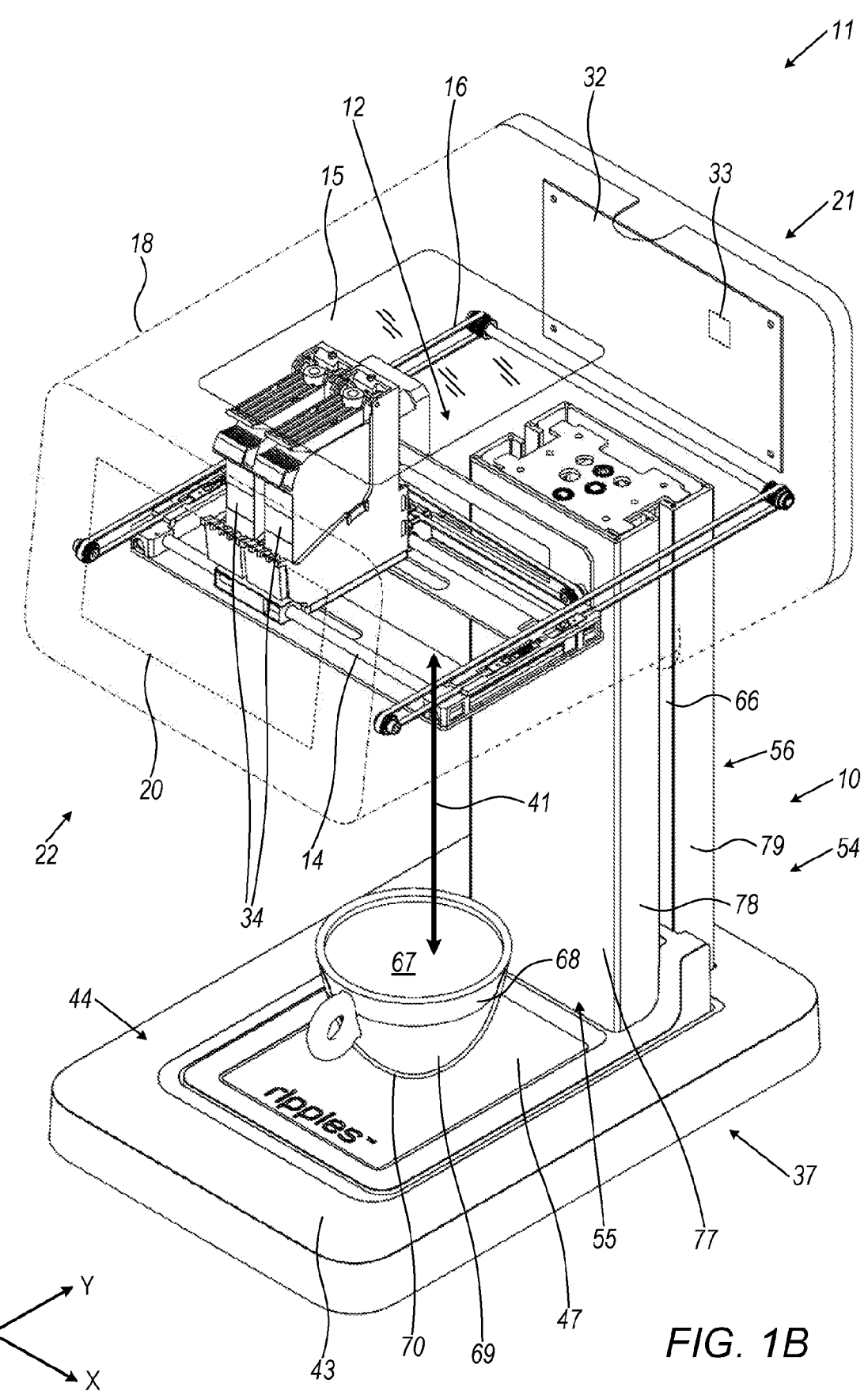

FIG. 1B is a schematic, pictorial illustration of system 11 at a loading/unloading position, in accordance with an embodiment of the present invention.

In some embodiments, in the example of FIG. 1B tray 44 is in the loading/unloading position such that a top surface 47 of tray 44 and a base surface 43 of base 37 of system 11 are approximately flush with one another. At this position, surface 67 is positioned at a different distance 41 from printing assembly 22, which is suitable for the loading/unloading position. For example, in the loading/unloading position the top surface of glass 70 is positioned at a distance sufficiently large (e.g., about 10 cm) for safely (i) loading glass 70 on tray 44, and (ii) unloading glass 70 off tray 44. At this position, system 11 is configured to prevent a collision between the glass and any part of printing assembly 22 during the loading/unloading of glass 70.

Figure 2A:
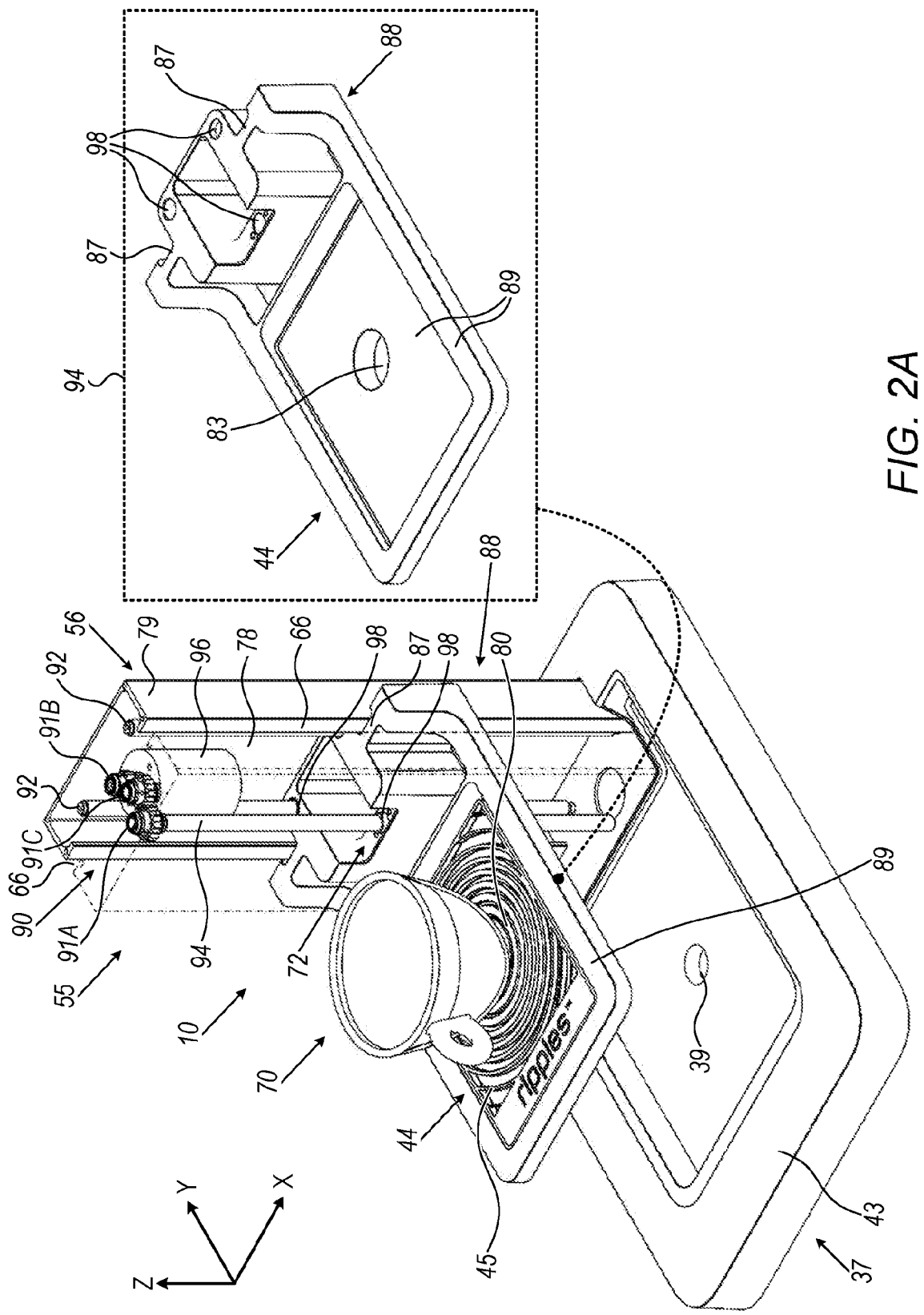
FIGS. 2A and 2B are schematic, pictorial illustrations of an assembly for vertically-moving a sample comprising FMSs for printing edible images thereon, in accordance with an embodiment of the present invention.

Blocking Spillage of Flowable-Matter Substrate from Wetting the Vertical-Axis Mechanism FIG. 2A is a schematic, pictorial illustration of an assembly for vertically-moving glass 70, in accordance with an embodiment of the present invention. In the example of FIG. 2A, tray 44 is positioned at a printing position as shown in FIG. 1A above, or when try 44 is being moved, along the Z-axis, between the loading/unloading and the printing positions described in detail in FIGS. 1A and 1B above.

In some embodiments, VAM 10 comprises one or more shafts, in the present example, (i) two rear shafts 92 configured to support a coupling mechanism (CM) 88 (described in detail below) while being moved along the Z-axis, and (ii) a rotatable shaft, in the present example a screw shaft 94, configured to be rotated (as will be described below) for moving CM 88. Note that shafts 92 and 94 are threaded through bores 98 of CM 88, so that CM 88 is configured to slide along shafts 92 and move with shaft 94 along the Z-axis as shown in FIG. 2A and will be described in detail hereinbelow.

In some embodiments, system 11 comprises a motion assembly (MA) 90, which comprises a motor 96 (e.g., any suitable type of an electric motor (e.g., a brushless motor) having an internal encoder (not shown) and controlled by processor 33 or any other suitable type of a motion controller receiving instructions from processor 33.

In other embodiments, motor 96 may comprise a servomotor or a stepper motor comprising a rotary actuator (or linear actuator) that allows for precise control of angular position (or linear position), speed and acceleration of movement along the vertical axis.

In some embodiments, MA 90 comprises gears 91A, 91B and 91C. In the present configuration, gear 91A is coupled to and configured to rotate screw shaft 94, gear 91B is coupled to and configured to be rotated by motor 96, and gear 91C is integrated between gears 91A and 91B for transferring the rotational movement therebetween. In order to move CM 88 along the vertical axis, motor 96 rotates gear 91A. This causes rotation of gear 91C, which in turn causes rotation of gear 91A, and further rotation of screw shaft 94. Note that screw shaft 94 is configured to convert the rotational movement to a linear movement so as to move CM 88 along the vertical axis of system 11.

In other embodiments, MA 90 may comprise any other suitable type of gear box, such as but not limited to pulley and belt. In alternative embodiments, MA 90 may comprise a motor, which is directly connected to a shaft, in the present example, motor 90 may be directly coupled with screw shaft 94.

In some embodiments, each of panels 55 and 56 has a U-shape, so that when panels 55 and 56 are facing one another at a predefined distance between surfaces 78 and 79, they are substantially surrounding VAM 10 and MA 90 and are defining respective slit 66, as described, for example, in FIG. 1A above and as also shown in FIG. 1B above.

In some embodiments, CM 88 has a clamp 72, which is configured to couple between CM 88 and screw shaft 94. Note that clamp 72 and CM 88 are coupled to tray 44 so that when screw shaft 94 rotates, both CM 88 and tray 44 are moved along the vertical axis and bores 98 are sliding along shafts 92 so as to control smooth and straight movement along the vertical axis. In some cases, vibrations that may occur when glass 70 is moved along the vertical axis, are prone to spill foam 68 and/or beer 69 from glass 70, and/or to blur the image printed on surface 67 of foam 68. In some embodiments, the sliding of bores 98 along shafts 92 and 94 enable the aforementioned smooth movement of CM 88 and tray 44 along the vertical axis without the undesired aforementioned vibrations.

In some embodiments, CM 88 has one or more tenons 87 shaped as a neck within the block of CM 88. As shown in FIG. 2A, each tenon 87 of CM 88 is positioned within a respective slit 66 defined between surfaces 78 and 79 or panels 55 and 56, respectively.

In some embodiments, tenon 87 serves as a bridge connecting between a first section of CM 88, surrounded by panels 55 and 56, and a second section of CM 88, which is coupled to tray 44. In such embodiments, each tenon 87 is configured to slide along respective slit 66 for moving CM 88 and tray 44 along the vertical axis.

In some embodiments, tray 44 comprises a frame 89, which is coupled to CM 88. In the present example, frame 89 and CM 88 are made from a single (e.g., molded) part, but in other embodiments, CM 88 and frame 89 may be coupled to one another using any suitable technique and configuration.

In some embodiments, tray 44 comprises a pad 45 made from any suitable material, such as rubber. Pad 45 is permeable to passage of FMSs (e.g., beer 69 and foam 68) and other sorts of fluids, and surface 47 of pad 45 has a texture sufficiently-rough to prevent slip of glass 70 across an XY-plane of tray 44. Pad 45 has a round section 80, which shows (e.g., to the bartender) the intended position of glass 70 on pad 45. Round section 80 is shown in more detail in FIG. 2B below. Note that pad 45 is inserted into frame 89 when positioning glass 70 on tray 44, and may be removed from frame 89, e.g., for the purpose of cleaning frame 89 and/or pad 45.

Reference is now made to an inset 93 showing the aforementioned single part comprising frame 89 of tray 44 and CM 88. Note that pad 45, panels 55 and 56, and shafts 92 and 94 are removed herein for the sake of the conceptual clarity and for more understood presentation of the following description.

In some embodiments, frame 89 has an opening 83, configured to pass FMSs and other fluids, which are spilled over tray 44, e.g., to a pipeline of a sewerage system. Inset 93 also shows in greater clarity, bores 98, which are sliding along respective shafts 92 and 94, and tenons 87, which are sliding along respective slits 66.

Reference is now made back to the general view of FIG. 2A. In some embodiments, base 37 has an opening 39, which is typically aligned with opening 83 of CM 88, and may also be aligned with round section 80 of pad 45. Opening 83 and 39 are aligned for passing FMSs and other fluids to the aforementioned pipeline of the sewerage system.

Figure 2B:
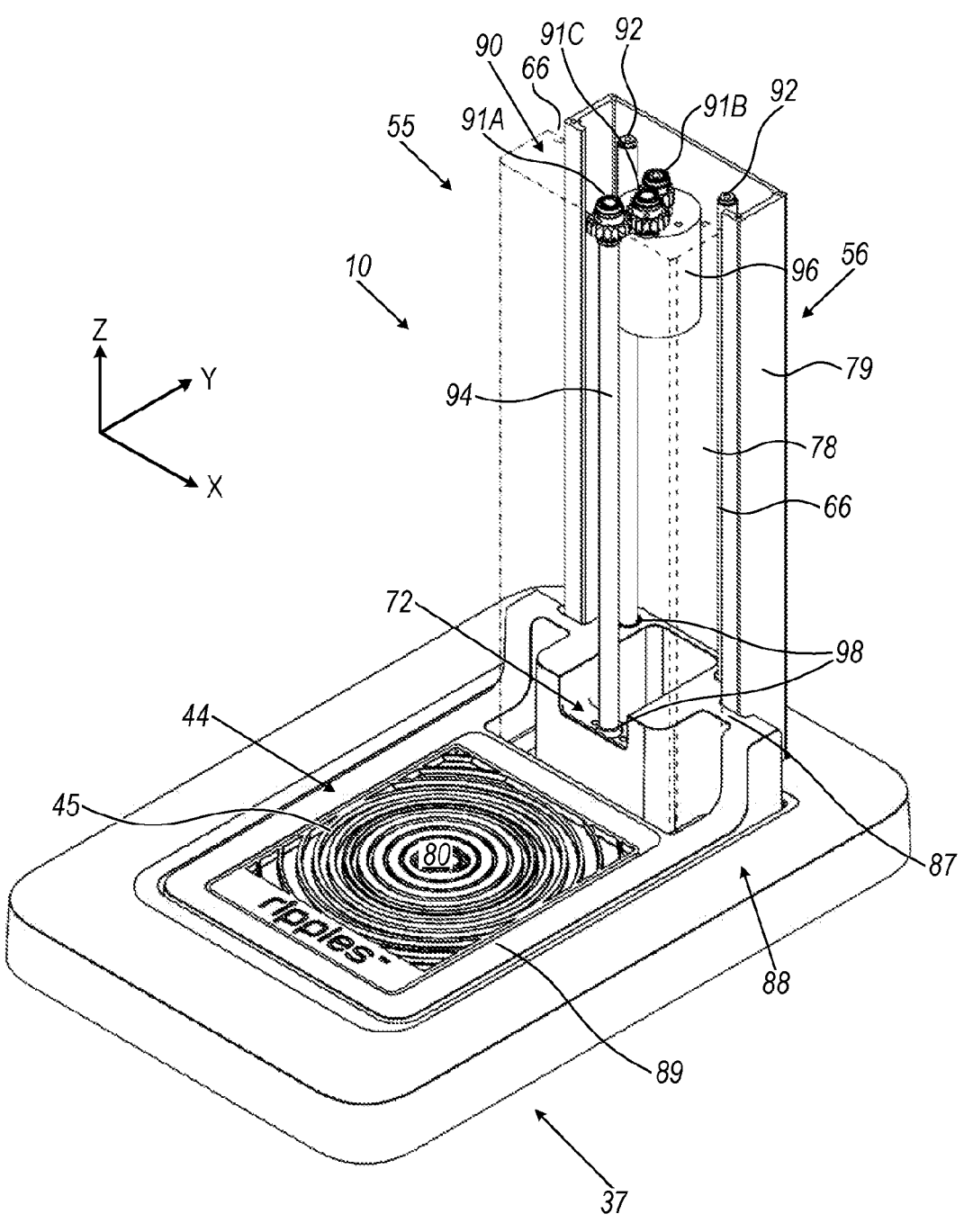

FIG. 2B is a schematic, pictorial illustration of VAM 10 and tray 44 used for vertically-moving glass 70 and of panels 55 and 56 and CM 88, in accordance with an embodiment of the present invention.

In the example of FIG. 2B, tray 44 is positioned at a loading/unloading position as shown in FIG. 1B above. Moreover, glass 70 is not placed on pad 45 of tray 44, so as to show one example embodiment of pad 45.

As described in FIG. 1B above, top surface 47 of tray 44 and base surface 43 of base 37 are approximately flush with one another. In some embodiments, by having surfaces 43 and 47 flush on XY-plane, the user (e.g., the bartender) of system 11 can move glass 70 across the XY-plane without having an undesired collision between class 70 and any part of system 11, such as with frame 89 of tray 44.

In some embodiments, in the configuration shown and described in FIGS. 2A and 2B, any spillage of one or more FMSs and/or other fluids, is blocked by panels 55 and 56 (and mostly by surface 77 of panel 55 as described, for example, in FIGS. 1A and 1B above) and cannot wet any of VAM 10 and/or MA 90 and other components surrounded by panels 55 and 56. Moreover, in some embodiments, frame 89 may have suitable slopes such that any of the spilled FMSs (and/or other fluids) are washed away, through opening 83, to the sewerage, and therefore, are not remained in system 11. Note that even in the loading/unloading position, panels 55 and 56 are almost completely encapsulating VAM 10 (except for slit 66) from being wetted by the FMSs.

Moreover, because slit 66 is narrow, e.g., having a width (along Y-axis) between about 7 mm and 10 mm, and is not facing glass 70, even massive spillage of FMS, cannot wet VAM 10.

These particular configurations of VAM 10, MA 90, CM 88, tray 44, and panels 55 and 56 of system 11 are shown by way of example, in order to illustrate certain problems that are addressed by embodiments of the present invention and to demonstrate the application of these embodiments in enhancing the performance of such a system. Embodiments of the present invention, however, are by no means limited to these specific sort of example modules, assemblies and parts described above, and the principles described herein may similarly be applied to other sorts of modules, and/or assemblies and/or parts of other systems configured to apply images (using printing or other suitable techniques) to one or more surfaces of any one or more flowable-matter substrates.

Producing a System for Printing Edible Images on Flowable-Matter Substrates

FIG. 3 is a flow chart that schematically illustrates a method for producing at least part of system 11, in accordance with an embodiment of the present invention.

The method begins at a tray receiving step 200, with receiving tray for moving glass 70 that may contain one or more flowable-matter substrates (FMSs), such as but not limited to at least one of beer 69 and foam 68.

At a printing assembly receiving step 202, printing assembly 22 is received for printing the image made from an edible substance on the upper-most FMS, e.g., surface 67 of foam 68, as described in FIG. 1A above.

At an axis mechanism positioning step 204, VAM 10 is received and positioned in system 11, e.g., between printing assembly 22 and tray 44, as shown in FIGS. 1A and 1B above. Moreover, as shown and described in FIGS. 1A and 1B, and in FIGS. 2A and 2B above, VAM 10 is positioned at the aforementioned location for moving tray 44 and glass 70 along the vertical axis and for controlling distance 41 between printing assembly 22 and surface 67 of foam 68.

In some embodiments, MA 90 may be coupled with VAM 10, e.g., using gears 91A, 91B and 91C as described in FIGS. 2A and 2B above. In other embodiments, tray 44 may be moved, along the vertical axis, manually by an operator of system 11 (e.g., the aforementioned bartender), and therefore, the assembly of MA 90 in system 11 may not be required.

At a coupling step 206, CM 88 that has one or more tenons 87 is coupled between VAM 10 and tray 44, as described in detail in FIGS. 2A and 2B above. In some embodiments, the coupling comprises threading shafts 92 and 94 through bores 98, threading screw shaft 94 through clamp 72 and fixing clamp 72 to CM 88.

At a cover assembling step 208, panels 55 and 56 of cover 54 are assembled to system 11 at a predefined distance from one another so as to define one or more respective slits 66. In response to the assembling, panels 55 and 56 are surrounding at least VAM 10 with slits 66 defined between surfaces 78 and 79 of panels 55 and 56, respectively. Note that during the assembly of panel 55, surface 77 is facing tray 44 and serves as a buffer between (i) pad 45 of tray 44, and (ii) VAM 10, so as to block spillage of foam 68 and/or beer 69 from wetting VAM 10 and other parts surrounded by panels 55 and 56, as described in FIGS. 2A and 2B above.

At a tenon positioning step 210 that concludes the production method, one or more tenons 87 of CM 88 are positioned within one or more respective slits 66, such that when CM 88 is moved along the vertical axis of system 11, each tenon 87 can slip along the respective slit 66, as described in FIGS. 1A and 2A above. Note that steps 208 and 210 may be carried out concurrently, so that panels 55 and 56 are assembled such that tenons 87 are positioned within the respective slits 66.

Although the embodiments described herein mainly address system for printing edible images on flowable-matter substrates, the methods and systems described herein can also be used in other applications, such as in any sort of food printing systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

a tray configured for placing thereon a sample comprising at least a first flowable-matter substrate;

a printing assembly configured to print an image, made from an edible substance, on a second flowable-matter substrate layer formed on the first flowable-matter substrate of the sample;

an axis mechanism configured to control a distance between the sample and the printing assembly by moving the tray with the sample along a vertical axis;

a coupling mechanism, which is configured to couple between the axis mechanism and the tray, wherein the axis mechanism comprises multiple rear shafts configured to support the coupling mechanism while being moved along the vertical axis, wherein the multiple rear shafts are threaded through bores of the coupling mechanism, so that the coupling mechanism is configured to slide along the multiple rear shafts along the vertical axis, and wherein the sliding of the bores along the multiple rear shafts enables straight movement of the coupling mechanism and the tray along the vertical axis without vibrations that are prone to spill at least one of the first and second flowable-matter substrates or blur the image;

a cover, which is configured to cover the axis mechanism, the cover having a front surface that at least partially faces the sample and is configured to block a spillage of at least one of the first and second flowable-matter substrates from wetting the axis mechanism, wherein the cover has one or more additional surfaces, which do not face the sample, wherein at least one of the additional surfaces has a slit that extends along the vertical axis, wherein the coupling mechanism comprises a tenon, which is positioned within the slit and is configured to slide along the slit for moving the coupling mechanism along the vertical axis, wherein the tray comprises a top surface for supporting the sample, and wherein the tenon is positioned, along the vertical axis, at a height greater than that of the top surface of the tray; and a base having a base surface, wherein in a loading and unloading position of the sample, the top surface of the tray and the base surface are flush with one another to enable the sample to be moved across an XY-plane onto or off the tray without collision.

2. The system according to claim 1, wherein the cover comprises (i) a first panel having the front surface, and (ii) a second panel positioned at a predefined distance from the first panel so as to form the slit between the first panel and the second panel.

3. The system according to claim 2, wherein the first panel comprises at least part of the one or more additional surfaces, which are bent relative to the front surface.

4. The system according to claim 2, wherein the first and second panels have a U-shape and are facing one another so as to form an inner volume containing at least the axis mechanism.

5. The system according to claim 1, and comprising a motion assembly, which is configured to drive the axis mechanism for moving the coupling mechanism.

6. The system according to claim 5, and comprising a processor, which is configured to control the motion assembly to move the tray between at least: (i) the loading and unloading position in which the sample is selectively placed on, and removed from, the tray, and (ii) a printing position, which is adjacent to the printing assembly for printing the image on the second flowable-matter substrate.

7. The system according to claim 5, wherein the axis mechanism comprises a rotatable shaft, which is configured to be rotated by the motion assembly and to move the coupling mechanism.

8. The system according to claim 5, wherein the rotatable shaft comprises a screw shaft.

9. A vertical axis mechanism (VAM), comprising:

a coupling mechanism, which is configured to couple between (i) an axis mechanism and (ii) a tray for placing thereon a sample comprising at least a first flowable-matter substrate, along the vertical axis so as to print on the sample an image made from an edible substance, wherein the axis mechanism comprises multiple rear shafts configured to support the coupling mechanism while being moved along the vertical axis, wherein the multiple rear shafts are threaded through bores of the coupling mechanism, so that the coupling mechanism is configured to slide along the multiple rear shafts along the vertical axis, and wherein the sliding of the bores along the multiple rear shafts enables straight movement of the coupling mechanism and the tray along the vertical axis without vibrations that are prone to spill the first flowable-matter substrate or blur the image; and a cover of the axis mechanism, the cover comprising a front surface that at least partially faces the sample and is configured to block a spillage of the first flowable-matter substrate from wetting the axis mechanism, wherein the cover has one or more additional surfaces, which do not face the sample, wherein at least one of the additional surfaces has a slit that extends along the vertical axis, wherein the coupling mechanism comprises a tenon, which is positioned within the slit and is configured to slide along the slit for moving the coupling mechanism along the vertical axis, wherein the tray comprises a top surface for supporting the sample, and wherein the tenon is positioned, along the vertical axis, at a height greater than that of the top surface of the tray, wherein the VAM is configured to be positioned between a printing assembly and a base having a base surface, and wherein in a loading and unloading position of the sample, the top surface of the tray and the base surface are flush with one another to enable the sample to be moved across an XY-plane onto or off the tray without collision.

10. The VAM according to claim 9, wherein the cover comprises (i) a first panel having the front surface, and (ii) a second panel positioned at a predefined distance from the first panel so as to form the slit between the first panel and the second panel.

11. The VAM according to claim 10, wherein the first panel comprises at least part of at least one of the one or more additional surfaces, which is bent relative to the front surface.

12. The VAM according to claim 10, wherein the first and second panels have a U-shape and are facing one another so as to form an inner volume containing at least the axis mechanism.

13. The VAM according to claim 9, and comprising a motion assembly, which is configured to drive the axis mechanism for moving the coupling mechanism.

14. The VAM according to claim 13, wherein the sample comprises a container, which is configured to contain at least a second flowable-matter substrate formed on the first flowable-matter substrate, and comprising a processor, which is configured to control the motion assembly to move the tray between at least: (i) the loading and unloading position of the container, in which the sample is selectively placed on, and removed from, the tray, and (ii) a printing position, which is adjacent to a printing assembly for printing the image on the second flowable-matter substrate.

15. A production method, comprising:

receiving a tray for placing thereon a sample comprising a flowable-matter substrate;

receiving a printing assembly for printing an image, made from an edible substance, on the flowable-matter substrate;

receiving an axis mechanism for moving the tray with the sample along a vertical axis, and a coupling mechanism for coupling between the axis mechanism and the tray, wherein the axis mechanism comprises multiple rear shafts configured to support the coupling mechanism while being moved along the vertical axis, wherein the multiple rear shafts are threaded through bores of the coupling mechanism, so that the coupling mechanism is configured to slide along the multiple rear shafts along the vertical axis, and wherein the sliding of the bores along the multiple rear shafts enables straight movement of the coupling mechanism and the tray along the vertical axis without vibrations that are prone to spill the flowable-matter substrate or blur the image;

coupling the coupling mechanism between the axis mechanism and the tray;

positioning the axis mechanism between the printing assembly and a base having a base surface, wherein the tray comprises a top surface for supporting the sample, and wherein in a loading and unloading position of the sample, the top surface of the tray and the base surface are flush with one another to enable the sample to be moved across an XY-plane onto or off the tray without collision; and covering the axis mechanism, using a cover having a front surface that at least partially faces the sample for blocking a spillage of the flowable-matter substrate from wetting the axis mechanism, wherein the cover has one or more additional surfaces, which do not face the sample, wherein at least one of the additional surfaces has a slit that extends along the vertical axis, wherein coupling the coupling mechanism comprises coupling a tenon, which is positioned within the slit and is configured to slide along the slit for moving the coupling mechanism along the vertical axis, and positioning the tenon, along the vertical axis, at a height greater than that of the top surface of the tray.

16. The method according to claim 15, and comprising coupling, to the axis mechanism, a motion assembly for driving the axis mechanism and moving the coupling mechanism.

17. The method according to claim 16, and comprising connecting the motion assembly to a processor for controlling the motion assembly to move the tray between at least: (i) the loading and unloading position in which the sample is selectively placed on, and removed from, the tray, and (ii) a printing position, which is adjacent to the printing assembly for printing the image on the flowable-matter substrate.

\* \* \* \* \*